United States Patent [19]
Nakamura et al.

[11] Patent Number: 6,014,444
[45] Date of Patent: Jan. 11, 2000

[54] APPARATUS FOR ENCRYPTED COMMUNICATION

[75] Inventors: Shigeaki Nakamura; Tetsuya Nishino; Yoshio Morita; Masahiro Inoue; Masaru Sato; Hiroshi Sakai; Yukihiro Oi; Yoshio Shirai, all of Osaka, Japan

[73] Assignee: Mita Industrial Co., Ltd., Osaka, Japan

[21] Appl. No.: 08/826,527

[22] Filed: Apr. 3, 1997

[30] Foreign Application Priority Data

Apr. 8, 1996 [JP] Japan ................................ 8-084930

[51] Int. Cl.[7] .............................. H04K 1/02; H04N 1/44
[52] U.S. Cl. .................................................. 380/9; 380/18
[58] Field of Search ................................ 380/18, 1, 2, 48

[56] References Cited

U.S. PATENT DOCUMENTS 5,757,911   5/1998   Shibata ........................................ 380/18

*Primary Examiner*—Gail O. Hayes
*Assistant Examiner*—Miles Horak
*Attorney, Agent, or Firm*—Antonelli, Terry, Stout & Kraus, LLP

[57] ABSTRACT

An apparatus for encrypted communication in which transmission data is encrypted based upon a cipher key and is transmitted. The received encrypted data is decrypted based upon a cipher key. A cipher key checker checks for agreement of the cipher keys by decoding the decrypted received data. The cipher key checker decodes the decrypted data in a unit of a preselected number of lines and determines whether the data are properly decoded or not.

4 Claims, 4 Drawing Sheets

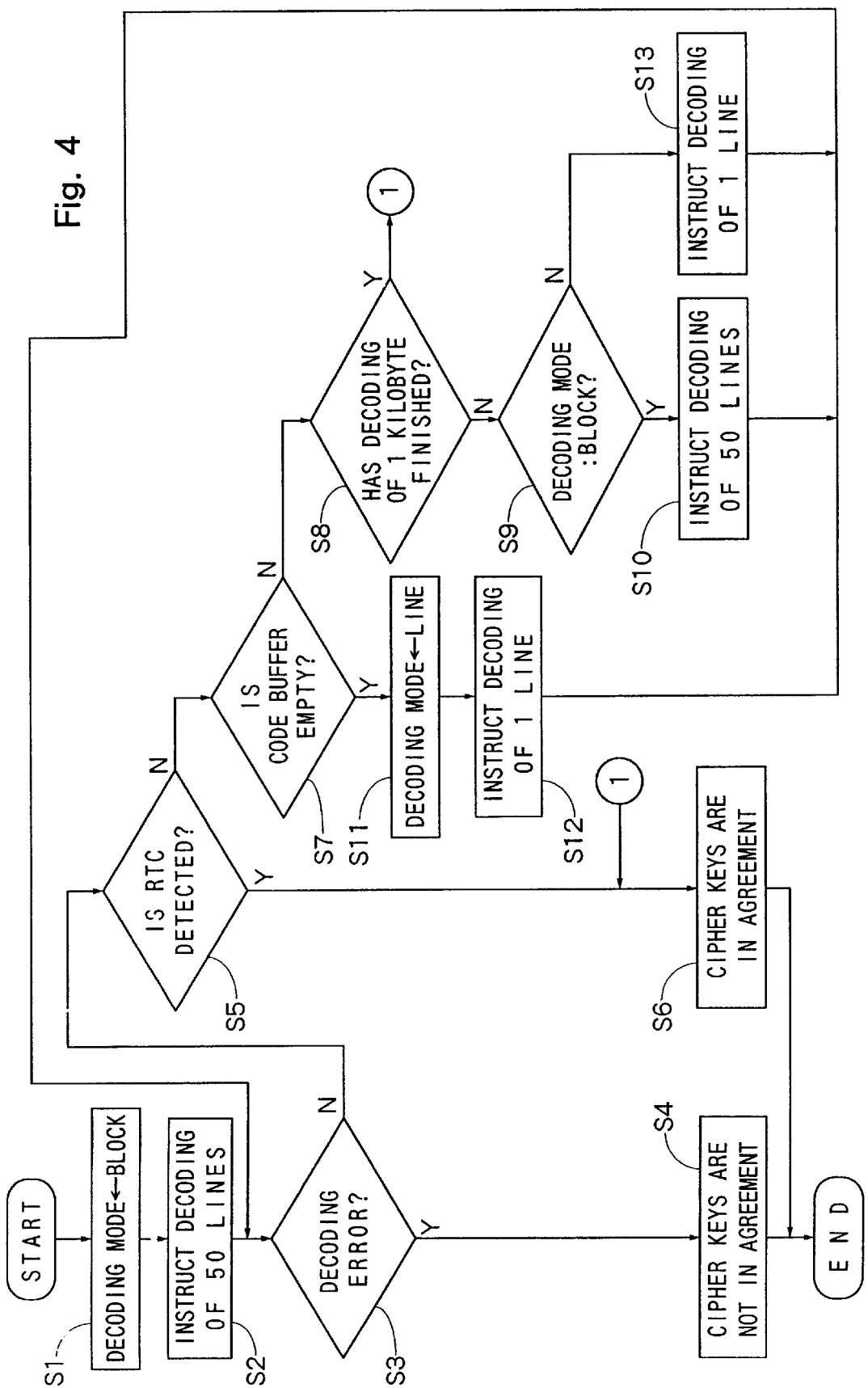

APPARATUS FOR ENCRYPTED COMMUNICATION

FIELD OF THE INVENTION

The present invention relates to an apparatus for encrypted communication and, more particularly, to an apparatus for encrypted communication equipped with a cipher key checking function for encrypted communication.

DESCRIPTION OF THE PRIOR ART

In conventional communications apparatuses such as telephone, wireless telegraph, facsimile and the like, encrypted communication has been executed by converting communication information into a cipher text by using a cipher key constituted by a predetermined bit sequence in order to maintain secrecy of communication information; as disclosed in, for example, Japanese Laid-Open Patent Publications Nos. 122541/1993 and 162692/1995. That is, in a terminal of the transmitting side, the manuscript data corresponding to a manuscript are subjected to a predetermined logical operation using a cipher key to prepare and transmit a cipher text which is quite different from the manuscript data. In a terminal of the receiving side, on the other hand, the received cipher text is subjected to a predetermined logical operation by using the same cipher key as the above-mentioned cipher key to decrypt the data.

In order to determine whether the cipher key used for encryption in the terminal on the transmitting side is in agreement with the cipher key used for decryption in the terminal on the receiving side, a method is employed of decoding the received data that have been decrypted in the terminal of the receiving side. In other words, it is concluded that the cipher keys used in the two terminals are the same when the decrypted data can be normally decoded, and that the cipher keys used in the both terminals are not the same where a decoding error results. In the conventional apparatuses for encrypted communication, however, the decoding is effected for each line; i.e., the decoding efficiency is poor, and an extended period of time is required for checking the cipher keys.

SUMMARY OF THE INVENTION

A principal object of the present invention is to provide an apparatus for encrypted communication which is capable of checking the cipher keys in a short period of time.

According to the present invention, in order to accomplish the above-mentioned principal object, there is provided an apparatus for encrypted communication including encrypting the transmission data based upon a cipher key and transmitting them, and decrypting the encrypted data that are received based upon a cipher key and outputting them, said apparatus for encrypted communication comprising a cipher key checking means for checking the cipher keys by decrypting the encrypted data that are received and then, decoding them; wherein said cipher key checking means decodes the decrypted data in a unit of a plurality of lines, concludes that the cipher key used for the encryption is in agreement with the cipher key used for the decryption when the data are normally decoded, and concludes that the cipher key used for the encryption is not in agreement with the cipher key used for the decryption when the data are not normally decoded, but a decoding error results.

According to the present invention, furthermore, there is provided an apparatus for encrypted communication, wherein the cipher key checking means sets the amount of the decrypted data to be checked to a predetermined number of bytes, decodes the decrypted data in a unit of a predetermined plural number of lines, and decodes the data in a unit of one line when the amount of the decrypted data is smaller than the predetermined plural number of lines.

According to the present invention, furthermore, there is provided an apparatus for encrypted communication wherein the cipher key checking means sets the amount of the decrypted data to be checked to a predetermined number of bytes, and decodes the data in a unit of one line when a line of the decrypted data exceeds said predetermined number of bytes.

BRIEF DESCRIPTION OF THE DRAWINGS

FIG. 4 is a flow chart illustrating the operation for checking the cipher keys in the encrypted communication using the facsimile shown in FIG. 1.

DETAILED DESCRIPTION OF THE PREFERRED EMBODIMENTS

A preferred embodiment of the apparatus for encrypted communication constituted according to the present invention will now be described with reference to the accompanying drawings, by taking a facsimile for instance. The present invention is in no way limited to the facsimile only, but can be adapted to a personal computer that executes encrypted communication and to any other apparatuses for encrypted communication.

Figure 1:
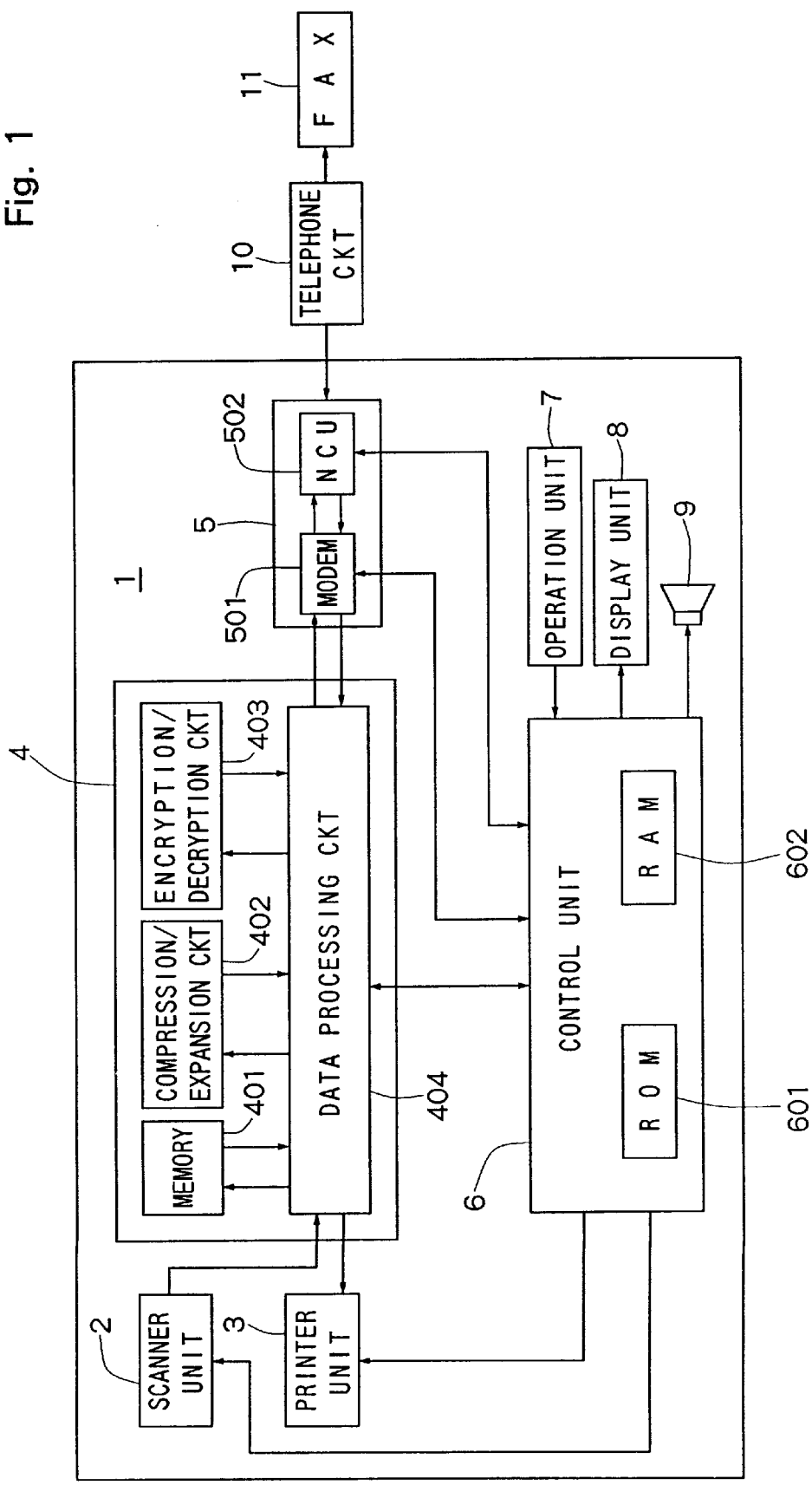
FIG. 1 is a block diagram illustrating the constitution of a facsimile apparatus for encrypted communication according to an embodiment of the present invention.

FIG. 1 is a block diagram illustrating a facsimile constituted according to the present invention. The facsimile 1 comprises a scanner unit 2 for reading a manuscript that is to be transmitted to a facsimile (FAX) 11 of another party, a printer unit 3 for printing the data (transmission data) read by the scanner unit 2 and the data (reception data) transmitted from the facsimile (FAX) 11 onto a recording paper, a data processing unit 4 for subjecting the transmission data and the reception data to predetermined processing, a data transmission unit 5 for transmitting the transmission data and receiving the reception data via a telephone circuit 10, and a control unit 6 for controlling the scanner unit 2, printer unit 3, data processing unit 4 and data transmission unit 5. The facsimile 1 further comprises an operation unit 7 comprising key switches such as numeral keys, one-touch keys and the like, a display unit 8 made up of LCD (liquid crystal display) and LED (light emitting diode) displays, and a speaker 9. The control signals of the operation unit 7, display unit 8 and speaker 9 are input to, or output from, the control unit 6.

The scanner unit 2 comprises an automatic manuscript conveyer unit for conveying a manuscript that is set, a CCD (charge-coupled device) line image sensor, and a image processing unit. The CCD line image sensor scans the manuscript to read the data in the direction in which the manuscript is conveyed (in the direction of lines of the manuscript), in a unit of lines. The data that are read out are subjected to predetermined image processings such as level correction, γ-correction, A/D conversion, etc., and are then output to the data processing unit 4.

In the diagramed embodiment, the printer unit 3 is constituted by a laser printer comprising a laser optical unit which converts modulation signals formed based upon the data forming an image (print image) to be printed into a laser beam, and outputs it, a developing unit for visualizing the latent image of the print image that is formed by the laser beam projected from the laser optical unit, a transfer unit which transfers the visualized print image onto the recording paper to form the image, and a fixing unit for fixing the print image that is transferred onto the recording paper.

The data processing unit 4 is constituted by a memory 401 which stores the transmission data and reception data, a compression/expansion circuit 402 for compressing and expanding the data, an encryption/decryption circuit 403 for encrypting the transmission data and for decrypting the reception data, and a data processing circuit 404 for controlling the processing for compressing/expanding (encrypting/decrypting) the transmission data and reception data, and for controlling the encryption/decryption processing.

In the diagramed embodiment, the memory 401 has a large capacity capable of storing about 100 pieces of manuscripts of a standard size of, for example, A4, so as to allow alternate reception, confidential reception and reserved transmission to be carried out.

The compression/expansion circuit 402 compresses the transmission data and expands the reception data based upon the data compression system according to T-4 counsel of the ITU-T (International Telecommunications Union). For example, the compression/expansion circuit 402 compresses the transmission data and expands the reception data based upon the MMR (modified modified read) encoding system. The compression/expansion circuit 402 may compress the transmission data and expand the reception data based upon other encoding systems such as MH (modified Huffman) encoding system or MR (modified read) encoding system in addition to the MMR encoding system.

The encryption/decryption circuit 403 encrypts and decrypts the data using a predetermined cipher key K that has been set in advance. That is, on the transmitting side, the initial data read by the scanner unit 2 and compressed by the compression/expansion circuit 402 are processed by using the cipher key K and are converted into encrypted data that cannot be easily discriminated (encryption). On the receiving side, the encrypted data that are received are processed by using the cipher key K which is in agreement with the cipher key K used on the transmitting side to restore the data to the initial data (decryption).

Based upon the control signals from the control unit 6, the data processing circuit 404 subjects the transmission data, the reception data and the communication data to a predetermined processing, and transmits the data or prints the data. When, for example, the content of the manuscript is to be transmitted by a facsimile, the data processing circuit 404 on the transmitting side stores the data of the manuscript read by the scanner unit 2 in the memory 401. As a timing signal for starting the transmission is input from the control unit 6, the data processing circuit 404 reads out the transmission data from the memory 401, compresses the data at a predetermined compression ratio through the compression/expansion circuit 402, encrypts the data through the encryption/decryption circuit 403 based upon an encryption instruction from the control unit 6, and outputs the encrypted data to the data transmission unit 5. The data of manuscript output to the data transmission unit 5 are transmitted to the facsimile (FAX) 11 of another party through the telephone circuit 10. On the other hand, the data processing circuit 404 of the receiving side stores the data received from the data transmission unit 5 in the memory 401. Upon receiving a timing signal for starting the recording from the control unit 6, the data processing circuit 404 reads out the transmission data from the memory 401, decrypts the data through the encryption/decryption circuit 403 based upon a decryption instruction from the control unit 6, expands the data at a predetermined expansion ratio through the compression/expansion circuit 402 (encoding), and outputs the encoded data to the printer 3.

The data transmission unit 5 is constituted by a modem (modulator/demodulator) 501 and an NCU (network control unit) 502 for selecting the station of another party and for connecting the circuit.

The control unit 6 contains a ROM (read-only memory) 601 storing a processing program for executing a facsimile function and a printer function and data for various processings (e.g., data related to the driving conditions such as the amount of light emitted from a source of light in the scanner unit 2, developing density of the printer 3, etc.), and a RAM (random access memory) 602 for storing the results processed according to the processing program. The processing program stored in the ROM 601 includes a program for checking the cipher key used for the encryption and decryption and, hence, the control unit 6 is provided with a cipher key checking means for checking the cipher key. The RAM 602 stores the cipher key K. The cipher key K is registered by a user through the operation unit 7 and, as required, is allowed to be changed or erased after registration.

The operation unit 7 has a variety of input keys which are used for inputting a facsimile number of another party when the communication by facsimile will be carried out, for instructing start and stop of communication by facsimile, for registering the cipher key K, for setting confidential transmission, and for setting various modes and conditions.

The display unit 8 displays, by characters, various information such as the name and facsimile number of another party with which the communication will be executed by facsimile, presence of encrypted communication, circuit connection, information about transmission condition, registration of a cipher key, content of input registered by another party, state of unregistered cipher key K in the receiving facsimile machine by the encrypted communication, and further indicates by an indicator an encoding error, communication error, setting mode, received image quality, alternate reception of memory, need for maintenance, etc.

The speaker 9 produces an alarm and transmits part of the character data by voice. For instance, the speaker 9 produces an alarm sound at the end of the facsimile transmission or at the start of the facsimile reception. When no counterpart cipher key K has been registered for the facsimile transmission or for the facsimile reception of the encrypted communication, the speaker 9 produces an alarm message stating that no cipher key has been registered.

Figure 2:
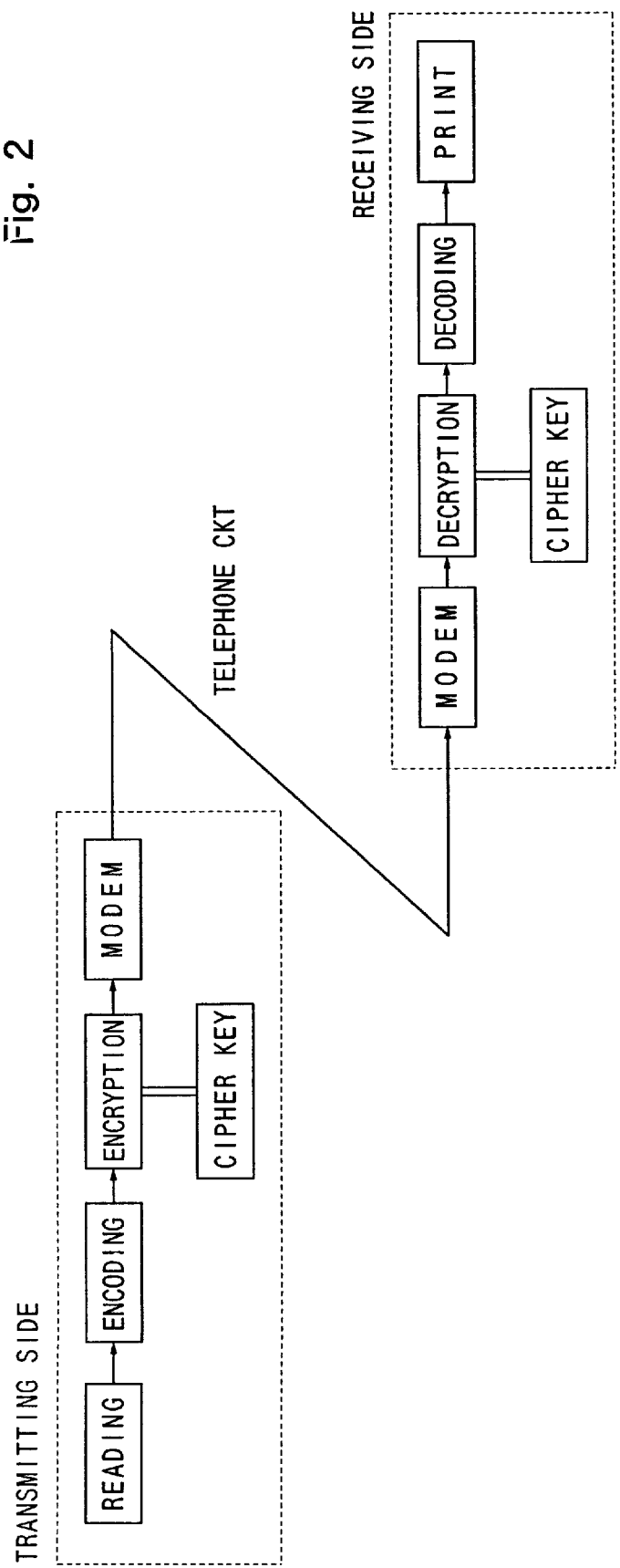
FIG. 2 is a diagram illustrating the flow of data in the encrypted communication using the facsimile shown in FIG. 1.

The facsimile according to the diagramed embodiment is constituted as described above, and described below with reference to FIG. 2 is the flow of data in an encrypted communication.

When the manuscript is set on the facsimile 1 of the transmitting side and when the facsimile number of the station of another party is input by an operator, the facsimile 1 of the transmitting side calls the station of the other party. When the telephone circuit 10 is connected to the station of the other party, the scanner unit 2 starts reading the manuscript that is set. Then, the image data read by the scanner unit 2 are stored in the memory 401 and are then subjected to the MMR encoding (compression) through the compression/expansion circuit 402. By using the cipher key K, the encoded data are encrypted through the encryption/decryption circuit 403, and a cipher text of the image data is sent from the modem 501 to the facsimile 1 of the receiving side through the telephone circuit 10.

The facsimile 1 of the receiving side receives, through the modem 501, the cipher text sent from the facsimile 1 of the transmitting side, and the cipher text received is decrypted through the encryption/decryption circuit 403 by using the cipher key K and is restored to the initial data. The data restored to the initial state are decoded (expanded) through the compression/expansion circuit 402, and the decoded data are sent to the printer 3 and are printed.

As described above, encrypted communication in which the data are encrypted by the facsimile 1 of the transmitting side and the cipher text obtained by the encryption is decrypted by the facsimile 1 of the receiving side does not allow the facsimile 1 of the receiving side to reproduce the image data transmitted from the facsimile 1 of the transmitting side unless the cipher key K used for encryption in the facsimile 1 of the transmitting side is in agreement with the cipher key K used for decryption in the facsimile 1 of the receiving side. In order to check whether the cipher keys K used in the transmitting side and in the receiving side are in agreement with each other or not, the received data decrypted in the facsimile 1 of the receiving side are decoded as described above. Then, when the received data that are decrypted can be properly decoded, it is concluded that the cipher keys used in the two facsimiles 1 are in agreement with each other. On the other hand, when a decoding error results, it is concluded that the cipher keys used in the two facsimile devices 1 are not in agreement with each other. Checking the cipher keys will now be described with reference to FIGS. 3 and 4.

Figure 3:
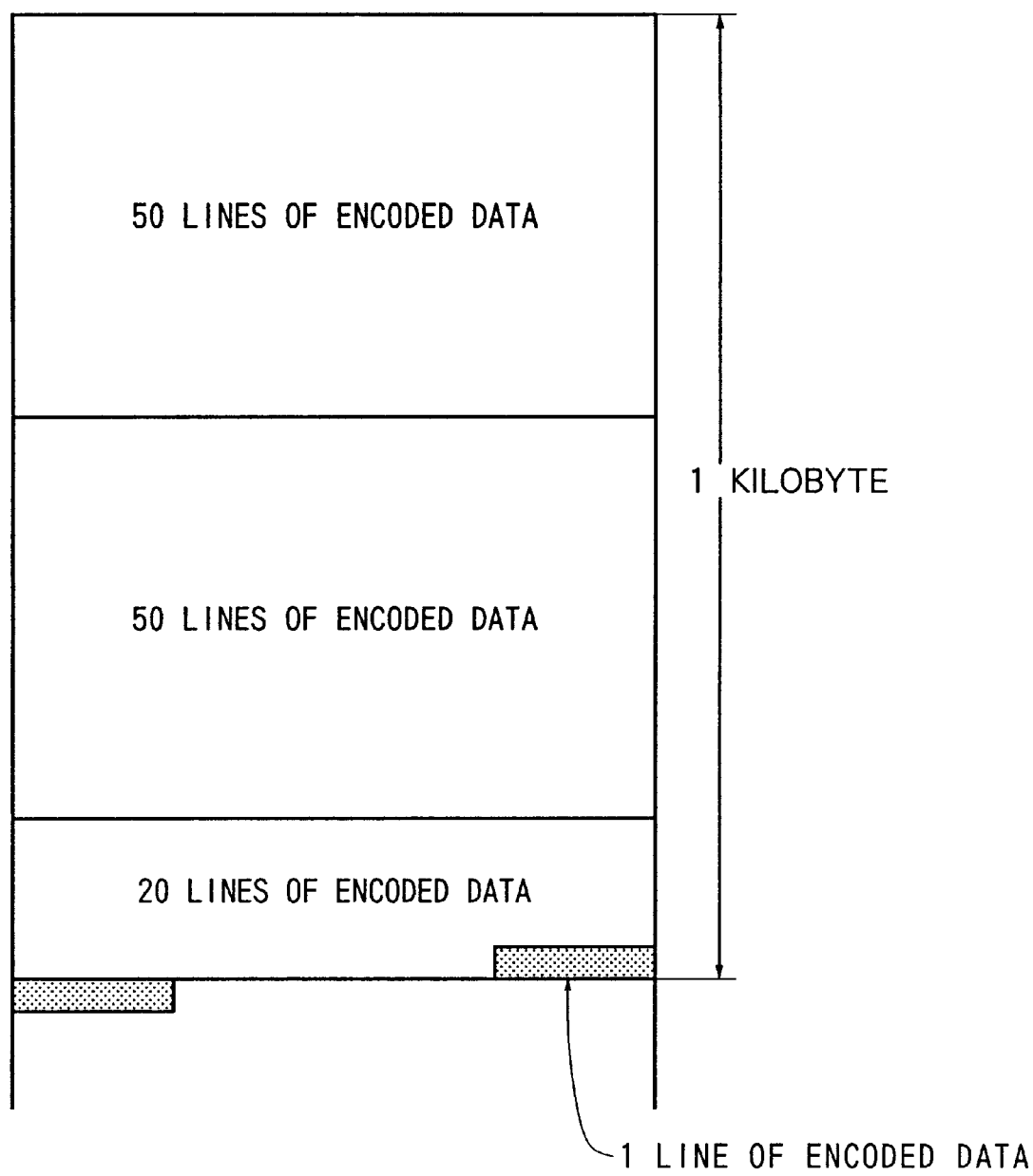
FIG. 3 is a diagram illustrating encoded data of one kilobyte for checking the cipher keys in the encrypted communication using the facsimile shown in FIG. 1.

FIG. 3 illustrates encoded data of one kilobyte that are decrypted for checking the cipher key K. In the diagramed embodiment, the size of the encoded data to be checked is set to be one kilobyte because of the reasons described below. That is, when the cipher key used for the decryption is different from the cipher key used for the encryption, and particularly, in the MMR encoding system, the encoded data after being decrypted are different from the encoded data before being encrypted, there remains a likelihood that the data of several bytes (several lines) may be decrypted to the encoded data without producing a decoding error. In order to avoid incorrect determination that the cipher keys are in agreement based upon the data of several bytes only, therefore, the encoded data of a size as large as one kilobyte are decoded.

In the embodiment shown in FIG. 3, the data of one kilobyte include 120 complete lines of encoded data and one incomplete line of encoded data (the remaining data of the one incomplete line of encoded data, which are in excess of one kilobyte, are existing in a continuing region). Described below with reference to the flow chart of FIG. 4 is a procedure for decoding 120 lines of the encoded data of not more than one kilobyte in a unit of 50 lines.

At a step S1, first, the control unit 6 sets the decoding mode of the data processing unit 4 to a block mode. The control unit 6 then proceeds to a step S2 and instructs the data processing unit 4 to decode 50 lines of data. After the data processing unit 4 has decoded 50 lines of data, the control unit 6 proceeds to a step S3 and checks whether a decoding error has occurred or not. As a result of checking, when the data are not properly decoded but a decoding error occurs, it is concluded that the cipher key used for encryption in the facsimile 1 of the transmitting side is not in agreement with the cipher key used for decryption in the facsimile device 1 of the receiving side (step S4). In this case, when it is determined that the cipher keys are not in agreement, the control unit 6 causes the display unit 8 to display this fact so that the operator can know it. When there is no decoding error but the data are properly decoded as a result of checking at the step S3, the control unit 6 proceeds to a step S5 and checks whether an RTC (return to control) sign i.e., a sign attached to the end of the compressed encoded data is contained in the 50 lines of decoded data or not. When the RTC sign is detected, the decoding has been finished and it is concluded that the cipher key used for encryption in the facsimile 1 of the transmitting side is in agreement with the cipher key used for decryption in the facsimile 1 of the receiving side (step S6). In the diagramed embodiment, there exist encoded data of more than one kilobyte. In such a case, the RTC signal is not detected at the step S5. Therefore, the control unit 6 proceeds to a step S7 and checks whether the code buffer is empty or not, i.e., whether the decoded data are insufficient or not (the encoded data in the embodiment are less than 50 lines). In this embodiment, as the decoded data this time are the first 50 lines, the code buffer is not empty. In this case, the control unit 6 proceeds to a step S8 and checks whether the decoding of one kilobyte is completed or not. In this embodiment, as the decoded data of this time are the first 50 lines, the decoding of one kilobyte has not been finished. Therefore, the control unit 6 proceeds to a step S9 and checks whether the decoding mode has been set to a block mode or not. In this embodiment, the decoding mode has been set to the block mode at the step S1. The result of checking, therefore, is the block mode, and the control unit 6 proceeds to a step S10 and instructs the data processing unit 4 to decode the next 50 lines of data.

After the data processing unit 4 has executed the next 50 lines of decoding, the control unit 6 returns to the step S3 and checks whether the decoding error has occurred or not. When the data are properly decoded as a result of checking, the control unit 6 proceeds to the step S5 and checks whether the RTC sign is contained or not. In this embodiment, the RTC sign is not yet appearing, and hence the control unit 6 proceeds to the step S7 and checks whether the code buffer is empty or not. In this time in the embodiment, the code buffer is not yet empty, and the control unit 6 proceeds to the step S8 and checks whether the decoding of one kilobyte is finished or not. Even in this time in this embodiment, the decoding of one kilobyte has not been finished and hence, the control unit 6 proceeds to the step S9 to check whether the decoding mode has been set to the block mode or not. In this time, too, the decoding mode remains being set to the block mode. Accordingly, the result of checking is the block mode, and the control unit 6 proceeds to the step S10 and instructs the data processing unit 4 to decode the next 50 lines of data.

After the data processing unit 4 has executed the decoding of the next 50 lines of data, the control unit 6 returns to the step S3 and checks whether a decoding error is occurring or not. When the data are properly decoded as a result of checking, the control unit 6 proceeds to the step S5 and checks whether there is the RTC sign or not. In this embodiment, the RTC sign is not yet appearing, and the control unit 6 proceeds to the step S7 to check whether the code buffer is empty or not. In this embodiment, the encoded data decoded this time are of an amount of 20 lines and hence, the code buffer becomes empty. When the code buffer becomes empty, the control unit 6 cancels the decoding executed last time, and instructs the data processing unit 4 to decode the same encoded data again in a unit of one line. That is, the control unit 6 proceeds to a step S11 and sets the decoding mode of the data processing unit 4 to a line mode. The control unit 6 then proceeds to a step S12 and instructs the data processing unit 4 to decode one line of data. After one of data is decoded, the control unit 6 returns to the step S3 and checks whether a decoding error is occurring or not. When the data are normally decoded as a result of checking, the control unit 6 proceeds to the step S5 to check whether there is the RTC sign or not. In this embodiment, the RTC sign is not yet appearing and the control unit 6 proceeds to the step S7 to check whether the code buffer is empty or not. In this time in the embodiment, the data are decoded in a unit of one line and the code buffer is not empty. Therefore, the control unit 6 proceeds to the step S8 to check whether the decoding of one kilobyte of data is finished or not. In this embodiment, the decoding of one kilobyte has not been finished even this time, and the control unit 6 proceeds to the step S9 to check whether the decoding mode has been set to the block mode or not. In this embodiment, the decoding mode has been already set to the line mode at the step S11, and the control unit 6 proceeds to a step S13 and instructs the data processing unit 4 to decode the next line and returns to the step S3. The above-mentioned steps are repetitively executed. When in this embodiment, the decoding of a unit of one line is executed 21 times, it is determined at the step S8 that the decoding of one kilobyte is finished. When the decoding of one kilobyte is finished at the step S8, the control unit 6 determines that the cipher key used for encryption in the facsimile 1 of the transmitting side is in agreement with the cipher key used for decryption in the facsimile 1 of the receiving side (step S6).

When the first line of the encoded data after being decrypted exceeds one kilobyte, the decoding is effected in the line mode and hence, all of one line of encoded data are decoded. It is therefore made possible to reliably check one line of encoded data.

In the diagramed embodiment, the encryption/decryption processing is executed in a hardware manner through the encryption/decryption circuit 403 in the data processing unit 4. However, the encryption and decryption may be executed in a software manner by the control unit 6.

In the apparatus for encrypted communication of the present invention as described above, the terminal is provided with a cipher key checking means for checking the cipher keys by decrypting the received data and then decoding the decrypted data, and the cipher key checking means decodes the decrypted data in a unit of a plurality of lines to determine whether the data are properly decoded or not. Therefore, the cipher keys can be checked in a short period of time compared with the prior art which decodes the data in a unit of one line.

What we claim is:

1. An apparatus for providing encrypted communication, comprising encryption/decryption means for encrypting transmission data based upon a cipher key and transmitting the encrypted transmission data, and for receiving encrypted data, decrypting the encrypted received data based upon a cipher key, and outputting the decrypted received data as received encoded data; and cipher key checking means for checking the cipher keys of the encrypted transmission data and the decrypted received data for agreement, wherein:

said cipher key checking means includes means for dividing the received encoded data into groups, each group having a preselected number of bytes of the received encoded data; means for dividing one of the groups into units, each unit having a preselected number of lines of the received encoded data; means for decoding a first one of the units; means for concluding that the cipher key used for the decryption is in agreement with the cipher key used for the encryption when the first one of the units of data are normally decoded and for concluding that the cipher key used for the decryption is not in agreement with the cipher key used for the encryption when the first one of the units of data are not normally decoded, but a decoding error results; and means responsive to the conclusion that the cipher key used for the decryption is in agreement with the cipher key used for the encryption for decoding further ones of the units until the number of lines of encoded data remaining in the one of the groups is less than the preselected number of lines, and then decoding the remaining lines in the one of the groups one line at a time until the entire group has been decoded.

2. An apparatus for providing encrypted communication, comprising encryption/decryption means for encrypting transmission data based upon a cipher key and transmitting the encrypted transmission data, and for receiving encrypted data, decrypting the encrypted received data based upon a cipher key, and outputting the decrypted received data as received encoded data; and cipher key checking means for checking the cipher keys of the encrypted transmission data and the decrypted received data for agreement, wherein:

said cipher key checking means includes means for dividing the received encoded data into units, each unit having a preselected number of lines of the received encoded data; means for decoding a first one of the units; means for concluding that the cipher key used for the decryption is in agreement with the cipher key used for the encryption when the first one of the units of data are normally decoded and for concluding that the cipher key used for the decryption is not in agreement with the cipher key used for the encryption when the first one of the units of lines of data are not normally decoded, but a decoding error results; and means responsive to the conclusion that the cipher key used for the decryption is in agreement with the cipher key used for the encryption for decoding further ones of the units until the number of lines of encoded data remaining is less than the preselected number of lines, and then decoding the remaining lines one line at a time until all the data has been decoded.

3. A method of providing encrypted communication, comprising the steps of:

(a) at a receiving station, receiving encrypted data that has been encrypted at a transmission station using a cipher key;

(b) decrypting the received encrypted data into encoded data, using a cipher key;

(c) dividing the encoded data into units, each unit having a preselected number of lines of the encoded data;

(d) decoding a first one of the units of lines;

(e) concluding that the cipher key used for the decryption is in agreement with the cipher key used for the encryption when the first one of the units of lines of data are normally decoded, and concluding that the cipher key used for the decryption is not in agreement with the cipher key used for the encryption when the first one of the units of lines of data are not normally decoded, but a decoding error results; and (f) in response to the conclusion that the cipher key used for the decryption is in agreement with the cipher key used for the encryption, decoding further ones of the units of lines until the number of lines of encoded data remaining is less than the preselected number of lines, and then decoding the remaining lines one line at a time until all the data has been decoded.

4. A method as claimed in claim 3, further comprising, at the transmission station and before step (a):

(i) encoding data to be communicated, (ii) encrypting the encoded data using the encryption cipher key; and (iii) transmitting the encrypted data to the receiving station.

* * * * *